United States Patent

Rickard et al.

[11] Patent Number: 5,995,566
[45] Date of Patent: Nov. 30, 1999

[54] INTERFERENCE REDUCTION IN TELECOMMUNICATION SYSTEMS

[75] Inventors: Robin Paul Rickard, Bishop's Stortford; Benedict Russell Freeman, Cambridge, both of United Kingdom

[73] Assignee: Northern Telecom Limited, Montreal, Canada

[21] Appl. No.: 08/739,492

[22] Filed: Oct. 28, 1996

[30] Foreign Application Priority Data

Nov. 4, 1995 [GB] United Kingdom .................... 9522675

[51] Int. Cl.[6] .................................................. H03D 1/04
[52] U.S. Cl. .......................... 375/346; 379/410; 379/416; 455/296; 455/304
[58] Field of Search ..................... 375/260, 285, 375/346, 324, 345, 348, 349, 327, 330, 375, 376; 379/410, 416; 455/296, 304, 305

[56] References Cited

U.S. PATENT DOCUMENTS

| | | | |
|---|---|---|---|
| 4,479,258 | 10/1984 | Namiki | 455/295 |
| 5,305,351 | 4/1994 | Mizoguchi | 375/345 |
| 5,613,233 | 3/1997 | Vagher | 455/296 |
| 5,673,290 | 9/1997 | Cioffi | 375/346 |
| 5,680,451 | 10/1997 | Betts et al. | 379/410 |
| 5,742,527 | 4/1998 | Rybicki et al. | 375/295 |
| 5,761,190 | 6/1998 | Yamauchi et al. | 370/210 |

*Primary Examiner*—Wellington Chin
*Assistant Examiner*—Conguan Tran
*Attorney, Agent, or Firm*—Lee, Mann, Smith, McWilliams, Sweeney and Ohlson

[57] ABSTRACT

This invention relates to telecommunications systems. In a subscriber loop carrying high speed data signals, noise cancellation is achieved by a data signal demodulator having first and second inputs 81,82, arranged to receive differential data signal and local field RFI input signals respectively. A feedback signal of the demodulator is sampled, processed, vector modulated and then combined with the local field RFI input signal of the demodulator. The combined signal is summed with the differential input signal to thereby reduce interference coupled with the first input.

18 Claims, 4 Drawing Sheets

S/P = serial to parallel converter
t = time index for each IFFT cycle
N = 2 Ns
T = symbol period of DMT modulator

INTERFERENCE REDUCTION IN TELECOMMUNICATION SYSTEMS

FIELD OF THE INVENTION

This invention relates to telecommunications systems and particularly, but not exclusively to reducing interference when transmitting data signals over a subscriber loop.

BACKGROUND TO THE INVENTION

Public telecommunications networks were originally developed to provide voice communications between subscriber terminals. In recent years traditional wire has been replaced by fibre optics for long distance communications. With the expansion of such networks from the traditional telephone or POTS service into the provision of a variety of digital services, there is now a need to provide improved subscriber access to the network. Presently data traffic operates at frequencies below 5 KHz. Increasing amounts of data traffic are beginning to saturate the available channels and it is becoming apparent that higher operating frequencies are required to handle the increasing amounts of data, for example, from video on demand networks, direct digital broadcasts, and high capacity links for computers.

Typically subscribers are coupled to a telecommunications network with a twisted pair wire loop commonly referred to as the subscriber loop. This twisted pair connects to a node associated with an optical distribution network which can be some 1000 m away from the subscriber. Such an arrangement is depicted in FIG. 1. The first 950 m or so of cabling 12 from a junction box 10 is covered underground with trunking containing many twisted pairs of underground feeders 14, and the final 50 m or so of wire from a distribution point 16 to a subscriber's installation is normally above ground and consists of an individual twisted pair 18 to each house 20. Thus, for the last length of cable, the wires are ordinary telephone wires. If a subscriber's equipment is located proximate to a source of radio interference, for example transmissions from a radio amateur, then signals can be picked up very strongly on the two wires.

Typically, in twisted pair copper loop networks, signals are transmitted in differential mode; that is to say, the signals are transmitted along both wires and any Radio Frequency Interference (RFI) will be picked up by both wires approximately equally with the wanted signal being determined by the differential signal between the two wires, at the receiver. Since high speed data is transmitted in this fashion, there should be no transmission problems in such an arrangement. However, there may be present a certain amount of breakthrough between the common mode and the differential mode and some interference leaking through differentially, even though the interference is predominantly received in common mode. Differential interference signals may be up to 30 dB less than the common mode interference signal, but this can cause problems if it is strong enough to distort the output of the associated analogue-to-digital converter, ADC, in addition to providing an increase in the background interference resulting in a corresponding decrease in the output carrier-to-noise ratio, CNR.

OBJECT OF THE INVENTION

It is an object of the invention to reduce the effects of interference in general and, in particular, interference generated from sources such as amateur radio transmitters when schemes such as Discrete Multitone Modulation are used on domestic telephone lines to provide digital services to subscribers.

SUMMARY OF THE INVENTION

In accordance with the present invention there is provided a data signal demodulator operable to receive differential and local field signals at first and second inputs respectively; wherein the first input is connected to a summation means which is operable to output signals to a cascade arrangement of an automatic gain control means, analogue to digital converter, and signal processing means; wherein the second input is connected to a multiplication means which is operable to receive an input from a feedback circuit; and wherein an output from the multiplication means is connected to the summation means. The local field signal could be provided by a common mode signal associated with the transmission medium, for example a twisted pair cable. Preferably, the signal processing means includes digital filter means, such as a fast Fourier transform processor and a decoder circuit. The feedback circuit input can be connected to the output from the analogue to digital converter or to an output from the decoder means.

The decoder circuit preferably comprises an output bit stream buffer which includes an FFT output bin selection unit connected to the feedback circuit. Preferably the feedback circuit includes: a processor operable to apply perturbation steps to the digital feedback signal, and vector modulate this signal with a complex weight; and convert the digital weight to an analogue signal.

In accordance with another embodiment of the invention, there is provided a digital data system demodulator having first and second inputs arranged to receive differential and local field input signals of a data signal respectively, wherein the feedback signal from the output of the demodulator is sampled, processed and then combined with the local field input signal of the demodulator, which combined signal is summed with the differential input signal to thereby cancel interference coupled with the differential signal.

In accordance with another aspect of the invention, there is provided a method of demodulating a differential signal in the presence of a local field signal wherein differential and local field signals are fed to at first and second inputs, respectively, of a data demodulator the method steps comprising: inputting the differential signal to a summation means the output of which is converted to digital representation; feeding back a signal which is input to a processing means, generating a weight signal which is multiplied with the local field signal by a multiplication means; and outputting from the multiplication means a signal which is summed with the differential signal by the summation means, whereby the effects of interference are reduced.

Preferably the digital signal output from the analogue to digital converter is filtered. This can be accomplished by converting the signal from a time domain representation to a frequency domain representation and then decoding this signal by decoder means. The decoder means can comprise an output bit stream buffer which includes an FFT output bin selection unit which outputs to the feedback circuit. Preferably the feedback circuit applies perturbation steps to the digital feedback signal and subsequently weights this signal with a complex weight; and then converts this digital signal to analogue.

In accordance with another aspect of the invention, there is provided a data demodulator wherein the method includes the step of sampling the output of the demodulator to reduce the amount of power entering the data demodulator by analogue cancellation of the differential input signal before being input to an analogue to digital converter. The method cancels narrow band interference by the use of an adaptive perturbation algorithm to derive an appropriate weight from a sample of some of the local field signal and using it to cancel the interference that has appeared on the differential mode. This weight can be a single complex analogue weight which will appropriately scale and phase shift the local field signal such that, when it is combined with the differential signal, the resultant interferer is decreased.

In accordance with a still further aspect of the invention, there is provided a system for transmitting digital data in the form of a differential signal to a subscriber, comprising a twisted wire pair for carrying the differential signal to the subscriber's premises, means for demodulating the differential signal in the presence of RF interference picked up by the twisted pair cable, said demodulator having a digital data system demodulator having first and second inputs arranged to receive differential data signals and local field RFI signals respectively, wherein a feedback signal from the output of the demodulator is sampled, processed and then combined with the local field RFI signal of the demodulator, which combined signal is summed with the differential data input signal to thereby cancel interference coupled with the differential signal.

BRIEF DESCRIPTION OF THE DRAWINGS

In order to enable a greater understanding of the invention to be attained, reference will now be made to the figures as shown in the accompanying drawing sheets, wherein.

DETAILED DESCRIPTION OF PREFERRED EMBODIMENTS

Figure 1:
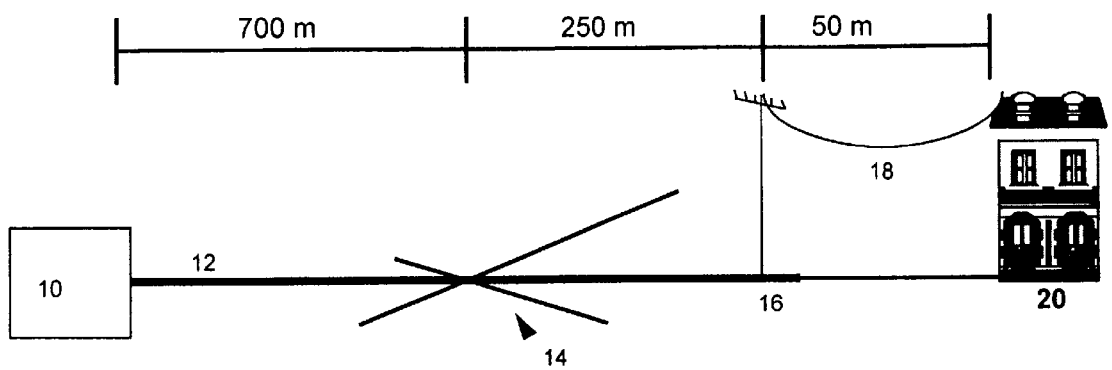
FIG. 1 shows a twisted pair copper loop which connects a node associated with an optical distribution network to a subscriber.
Figure 2:
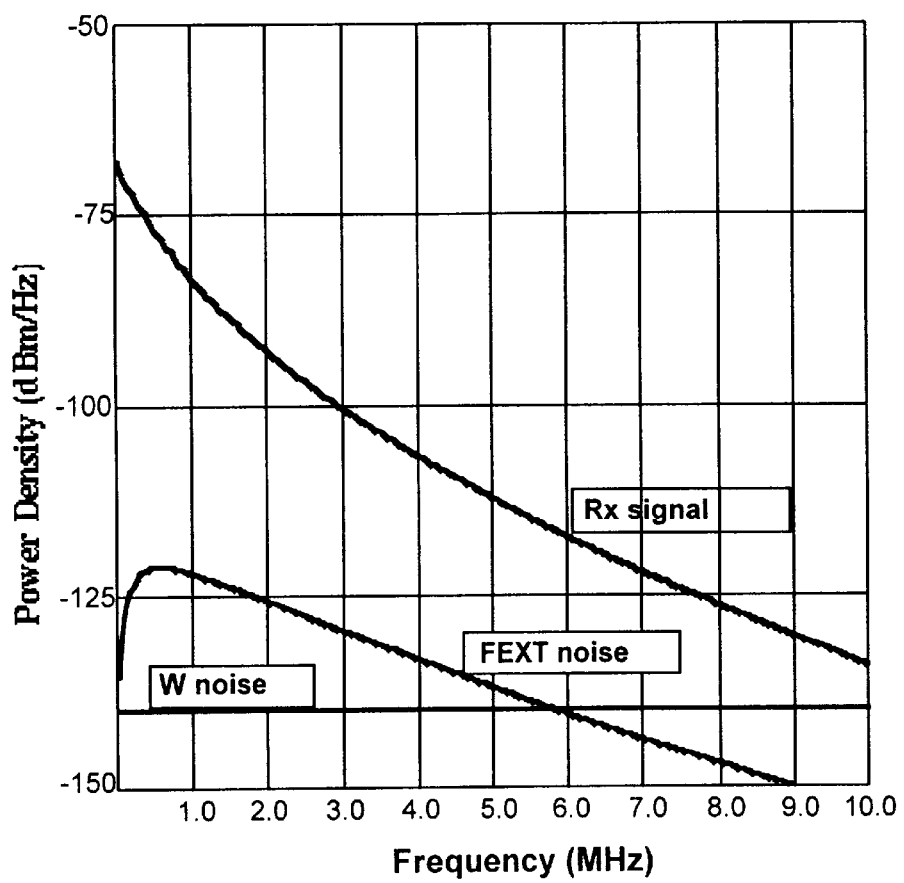
FIG. 2 shows the received signal and noise levels for the 1000 m copper loop shown in FIG. 1.

FIG. 2 shows typical received signal and noise levels for a 1000 m copper loop shown in FIG. 1. There are two dominant types of 'noise' which will limit the available CNR across the band: White (W) noise at −140 dBm/Hz across the band and far end cross talk noise, FEXT, from other twisted pairs in the distribution cables. The costs of replacing these loops with more efficient or higher bandwidth connections, e.g. a coaxial connection, is prohibitive and various techniques have therefore been proposed for providing effective digital communications data across the subscriber loop.

Figure 3:
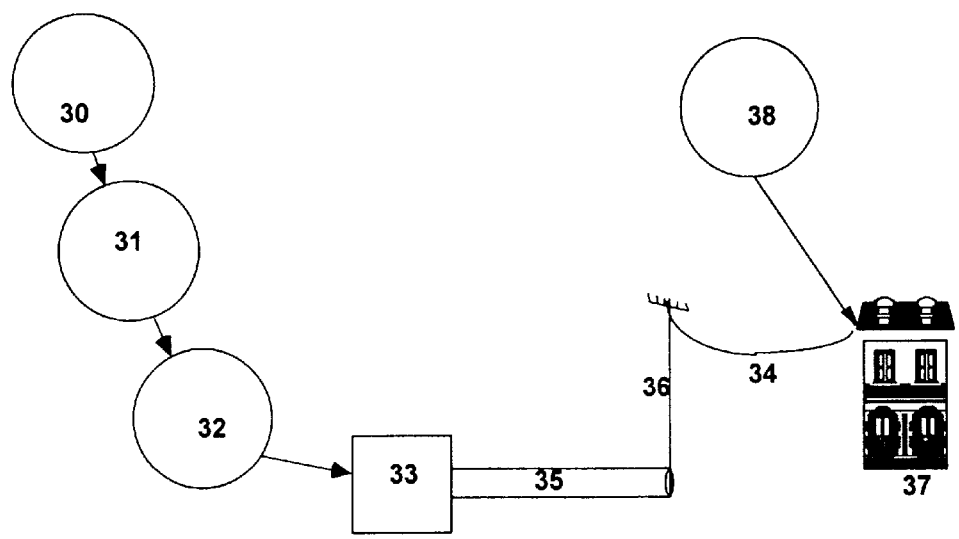
FIG. 3 shows a high-capacity telecommunications system for delivering services to a subscriber, according to one embodiment of the present invention.

FIG. 3 is a representation of a high speed data link suitable for the transmission of both digital data (such as Very Asymmetric Digital Subscriber Loop, VADSL, schemes) and analogue data, according to an embodiment of the invention. A broadcast centre 30 provides, for example, a digital video on demand service; this data is modulated by a modulator 31 and transmitted through a high capacity transmission medium, such as an optical fibre network 32. The optical fibres could support data links for hundreds of video subscribers; through various trunking arrangements, a fibre will terminate at a street-level junction box 33 to serve several subscribers. At this junction box there will be a modulator to serve each subscriber; data will be modulated by these modulators onto twisted wire pair carriers 34. As described in relation to FIG. 1, these twisted pair carriers will be directed through underground trunking 35 until they are required to be supported by pylons and the like 36 when proximate to subscriber's premises 37. The twisted pairs, upon entry to the subscriber's premises, will be passed to demodulator 38 prior to the data signals being passed to telephones and modems for video on demand, computer networking services and the like. Interference will be picked up by the twisted pairs most readily during transmission from the pylon to the subscriber's premises. Demodulator 38 is more fully described with reference to FIGS. 9 and 10.

In many countries radio transmissions are regulated in the 1–10 MHz region. For instance, in the United Kingdom, amateur radio transmissions are allowed over the 1.81–2.0, 3.5–3.8 and 7.0–7.1 MHz bands and these transmissions may be up to 400 W ERP from omnidirectional antennas using, for example, 2–3 KHz SSB modulation. Such allowed bands are known to couple onto the overhead telephone lines forming the last section of the copper loop. In the case of FIG. 1, the last 50 m of the copper loop to the subscriber. In this example, at this point in the transmission path, the signal will already have been attenuated by 950 m of underground cable and will therefore be very susceptible to interference. As discussed earlier, the interference will induce common mode voltages on the cable which will in turn appear as a differential voltage attenuated by the common mode rejection ratio, CMRR, of the cable. A typical broadband CMRR figure is 30 dB for one of these cables. This type of interference is particularly noticeable on lines operating with discrete multitone DMT Modulation schemes which provide very asymmetric digital subscriber line, VADSL, services to subscribers.

Discrete Multitone modulation (DMT) is a form of multicarrier modulation which superimposes several carrier-modulated waveforms to represent a bit stream. The standard DMT modulator is based on an Inverse Fast Fourier Transform (IFFT) and the standard DMT demodulator is based on a Fast Fourier Transform (FFT). One of the problems with the demodulator is its susceptibility to narrow band interferers. In the DMT system all the sub-carriers are orthogonal and are treated as independent carriers when demodulated by the FFT. However, a narrow band interferer will not be orthogonal and will be spread by the FFT into many of the demodulated sub-carrier decoded channels, causing a decreased CNR, even though the interferer may only be in one sub-carrier band.

Figure 4:
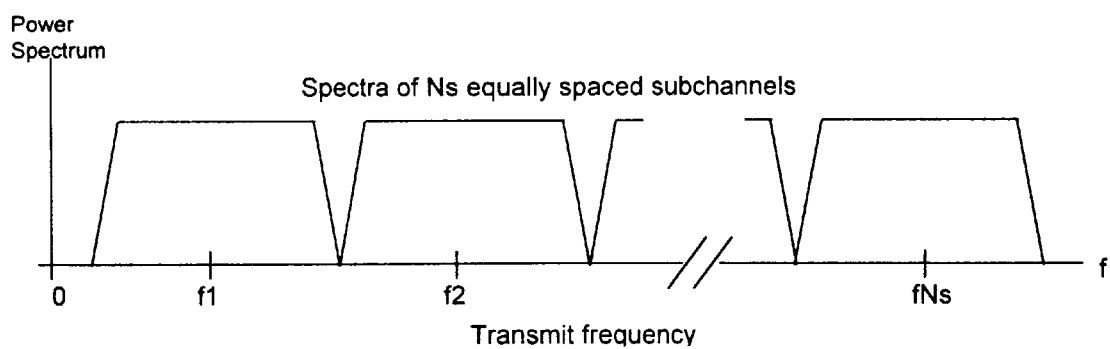
FIG. 4 shows the transmitted power spectrum of a multicarrier waveform.

FIG. 4 illustrates the transmitted power spectrum of a multicarrier waveform. The multicarrier transmit signal is the sum of the independent sub-channels, each of equal bandwidth and with centre frequency $F_i$; where i=1 . . . Ns=number of sub-channels. Each of the sub-channels could be a QAM modulated signal.

Figure 5:
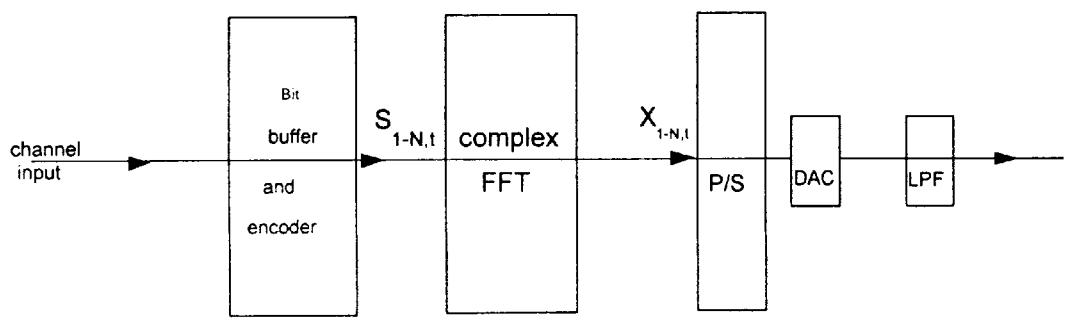
FIG. 5 is a basic DMT modulator.

A basic known DMT modulator is shown in FIG. 5 and comprises: an input bit stream buffer, an inverse fast Fourier transform unit, a serial formatting unit, a digital-to-analogue converter and an output low pass filter (LPF). In such an arrangement, an input bit stream of data rate R bps is buffered into blocks of $T_b$ bits by the buffer, where $T_b$ is the total no of input bits per modulator symbol. $T_b$ is given by the product of the data rate and the symbol period (T) of the DMT modulator. These $T_b$ bits will be divided amongst the sub-channels having $b_i$ bits.

Figure 6:
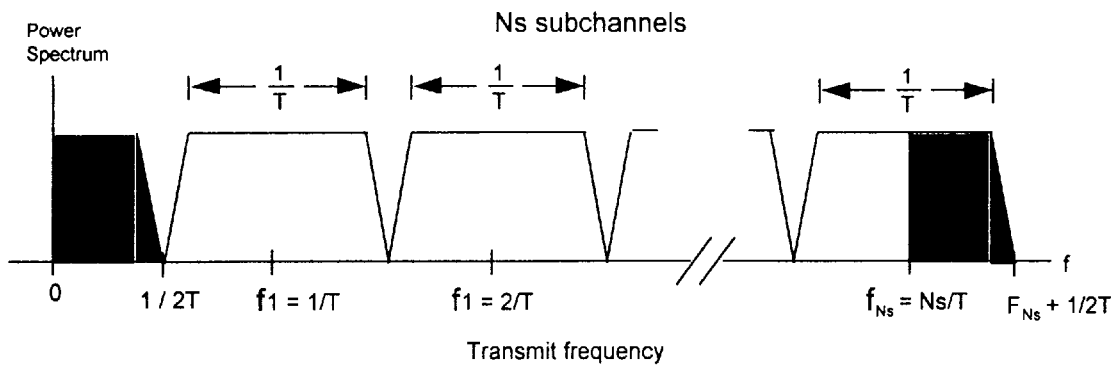
FIG. 6 shows an output spectrum from a DMT modulator.

These $b_i$ bits for each of the Ns sub-channels are translated in the DMT encoder into a complex sub-symbol $S_i$, for each sub-channel. Each subchannel has $2^{bi}$ possible QAM symbol states. The 2 $N_s$ point IFFT unit combines the Ns subsymbols into a set of N real-valued time domain samples, $X_n$, t; where n=1 . . . N, and t represents the sample time. These N samples are successively applied (in serial format) to a digital-to-analogue converter, DAC, which samples at a rate N/T—which is the sampling rate of the DMT modulator—to create a symbol for the DMT modulator. The output of the DAC is a continuous-time modulated signal x(t) which is a succession of DMT symbols each formed from N time domain samples. The output spectrum of the DMT modulator of FIG. 5 is shown in FIG. 6. The sub-channels are centred on $F_i=i/T$.

Figure 7:
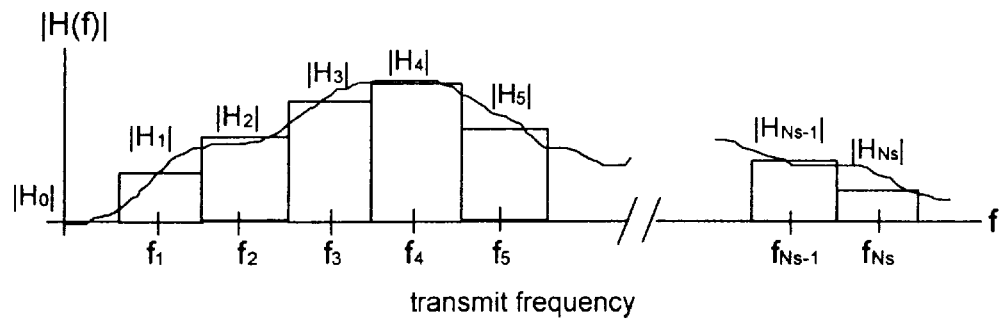
FIG. 7 shows the decomposition of a multi-channel signal.
Figure 8:
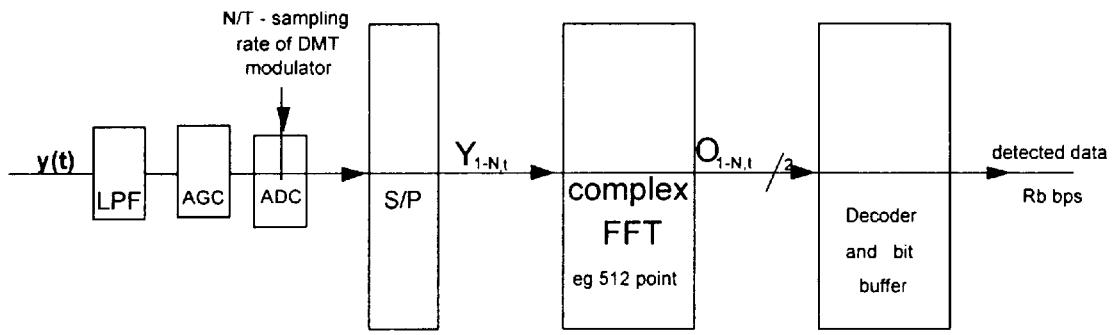
FIG. 8 shows another DMT demodulator.

As $N_s$ increases, the continuous transfer function of the transmission medium can be approximated as a discrete curve—see FIG. 7. Each of the rectangles is a band of frequencies 1/T Hz wide with the centre frequency $f_i$ and corresponds to the DMT sub-channel centre frequencies. When Ns is large the noise can be shown to be independent even if the noise spectrum is not flat. FIG. 8 shows a known type of DMT demodulator, which comprises an input low pass filter (LPF), Automatic gain control means (AGC), an analogue-to-digital converter (ADC), a serial formatting unit (SF), a fast Fourier transform unit (FFT), and an output bit stream buffer. In the presence of a narrow band interferer, the data rate of the DMT system can be severely reduced and could degrade a service such that it is unacceptable.

Figure 9:
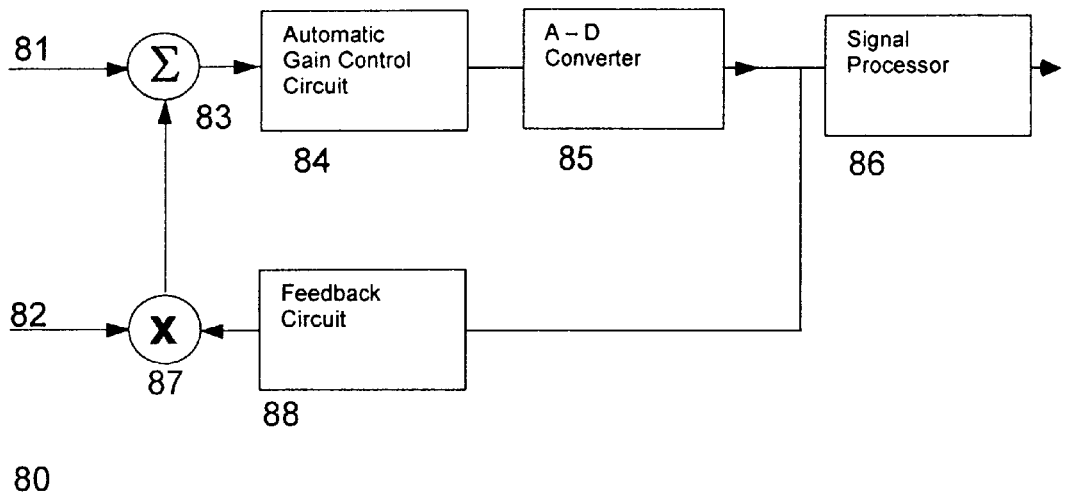
FIG. 9 shows DMT demodulator suitable for use in the system of FIG. 3.

FIG. 9 shows the architecture of one embodiment of the invention, which is a data signal demodulator, 80 operable to receive differential and local field signals at first 81 and second 82 inputs respectively. The first input is connected to a summation means 83 which is operable to output signals to a cascade arrangement of an automatic gain control circuit (AGC) 84, analogue to digital converter 85, and signal processor 86. The second input is connected to a multiplier 87 which is operable to receive an input from a feedback circuit 88. An output from the multiplier is connected to the summation means. The local field signal could be provided by a common mode signal associated with the transmission medium, for example a twisted pair cable. Preferably, the signal processor includes digital filter means, such as a fast Fourier transform processor and a decoder circuit. The feedback circuit input can be connected to the output from the analogue to digital converter or to an output from the decoder means.

Figure 10:
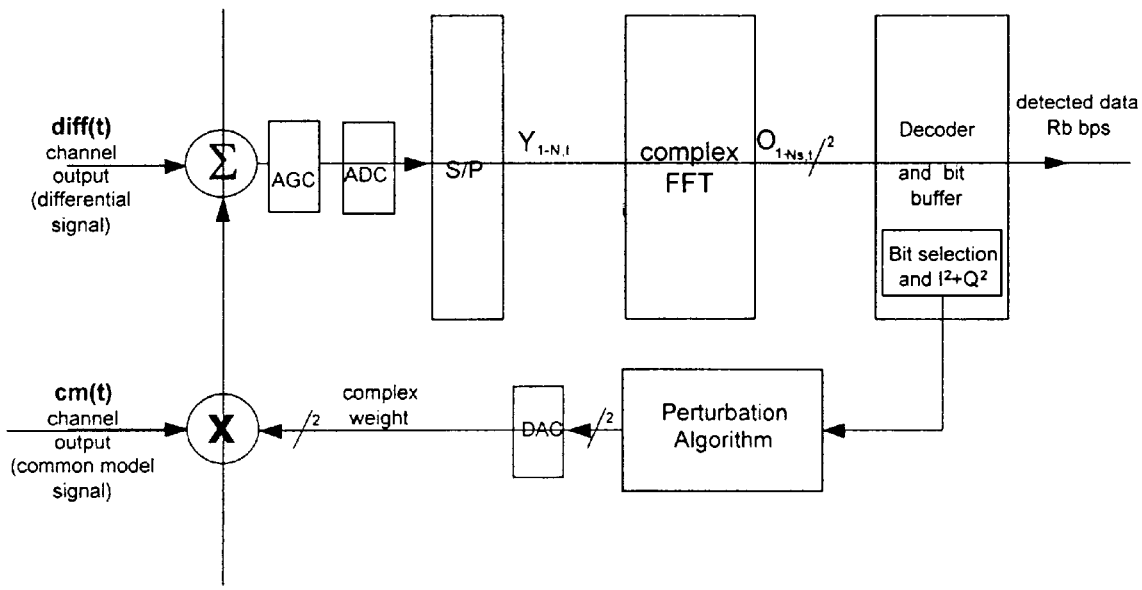
FIG. 10 shows an alternative DMT demodulator suitable for use in the system of FIG. 3.

A second embodiment is shown in FIG. 10, wherein the demodulator includes an input summer which receives a differential mode signal and a common mode signal multiplied by a feedback signal, which outputs to an analogue-to-digital converter, a serial formatting unit, a fast Fourier transform unit, and an output bit stream buffer. The output bit stream buffer comprises an FFT output bin selection unit which outputs to a feedback circuit, which feedback circuit includes a processor which applies perturbation steps to the feedback signal; this signal is weighted with a complex weight and is converted to analogue from digital and then multiplied with the common mode input signal.

The magnitude of the interference is fed into the signal processor and the perturbation algorithm starts an adaptive cancellation loop. Successive perturbation steps are applied to the complex weight in both inphase and quadrature (I and Q) components, in a cycle as follows: I up, I down, Q up, Q down. A typical process could take the following form: for each FFT cycle, a perturbation step is applied and after 4 FFT cycles, the weight is updated by a step in the direction which most reduces the interferer power. This new weight would then be then used as the start point for the next perturbation cycle and the process would be repeated with varying step & perturbation step sizes to allow a weight to be formed which cancels the interferer entirely. Obviously, many sequences and algorithms are possible.

Thus, the apparatus reduces the effect of interference by reducing the amount of power entering the demodulator by analogue cancellation prior to processing in the ADC or AGC. The digital subscriber service is provided differentially on the phone line, but the interference is coupled differentially onto the phone line by Common Mode to Differential Coupling. In, for example, telephone networks, in order to perform analogue cancellation of interferers from the differential signal, the common mode signal from the cable can be used as the local field signal and will be adjusted in amplitude and phase by a single complex weight and combined with the differential signal in anti-phase to form a resultant interference signal of reduced amplitude. This process allows the interference to be reduced significantly and the wanted signal to remain, virtually unaffected. The local field signal could be coupled from one of many sources; e.g. an antenna, another cable, or a pipe acting as an antenna.

The perturbation algorithm will benefit from the use of a narrow band filter centred on or near the interferer eg the use of FFT output signals in the demodulator to provide narrow band power feedback on the resultant interferer. This information can then be used to modify the analogue weight by use of a perturbation or similar algorithm to find the optimum weight.

In order to get a high level of cancellation, the interferer should be detected in quite a narrow bandwidth so that the interference is seen quite clearly above any noise or other signal. This would require extra filtering which excludes other signals and noise that would interfere with the required signal. One of the advantages of the described implementation is that because of the type of demodulator employed, narrowband filters are already provided in the configuration.

The embodiments of the invention described, thus provide a feedback loop which neatly fits in this type of demodulator since most of the detection and filtering is performed by the architecture of the demodulator. The embodiments are aimed at the situations where the interference signal is required to be reduced. By looking at a subset of the frequency band over which the wanted signals are spread, then the interference can be cancelled below the level of the wanted signal in that band.

It is to be noted that the particular embodiments described refer to a twisted pair transmission line: data can also transmitted by other modes wherein the signal comprises a wanted signal component and an unwanted signal component

We claim:

1. A digital data system demodulator having first and second inputs arranged to receive differential data signals and local field RFI signals respectively, said demodulator including a feedback circuit having an input and an output, wherein a feedback signal from the output of the demodulator is sampled, processed and then combined with the local field RFI signal of the demodulator, which combined signal is summed with the differential data input signal to thereby cancel interference coupled with the differential signal.

2. A demodulator according to claim 1, including digital filter means comprising a fast Fourier transform processor and a decoder circuit.

3. A demodulator according claim 1, wherein the feedback circuit input is connected to an output from an analogue to digital converter or to an output from a decoder circuit.

4. A data signal demodulator operable to receive differential and local field signals at first and second inputs respectively;
wherein the first input is connected to a summation means which is operable to output signals to a cascade arrangement of an automatic gain control means, analogue to digital converter, and signal processing means;
wherein the second input is connected to a multiplication means which is operable to receive an input from a feedback circuit;
wherein an output from the multiplication means is connected to the summation means to thereby cancel interference coupled with the differential signal,
  wherein the signal processing means includes digital filter means comprising a fast Fourier transform processor and a decoder circuit, which decoder circuit comprises an output bit stream buffer which includes an FFT output bin selection unit connected to the feedback circuit.

5. A demodulator according to claim 4, wherein the feedback circuit input is connected to the output from the analogue to digital converter or to an output from a decoder circuit.

6. A demodulator according to claim 4, wherein the feedback circuit input is connected to the output from the analogue to digital converter or to an output from a decoder circuit; and wherein the feedback circuit includes: a processor operable to apply perturbation steps to a digital feedback signal, vector modulate this signal with a complex weight; and convert a resultant digital weight to an analogue signal, wherein the signal processing means includes digital filter means comprising a fast Fourier transform processor and a decoder circuit, which decoder circuit comprises an output bit stream buffer which includes an FFT output bin selection unit connected to the feedback circuit.

7. A demodulator according to claim 4, wherein the local field signal is provided by a common mode signal associated with a transmission medium.

8. A telecommunications system comprising a demodulator as claimed in claim 4 and arranged to reduce the effects of unwanted signals on a wanted signal in a local subscriber loop.

9. A method of demodulating a differential signal in the presence of a local field RFI signal wherein differential and local field signals are fed to first and second inputs, respectively, of a data demodulator: the method steps comprising: inputting the differential signal to a summation means the output of which is converted to digital representation; feeding back a signal which is input to a processing means, generating a weight signal which is multiplied with the local field signal by a multiplication means; and outputting from the multiplication means a signal which is summed with the differential signal by the summation means, whereby the effects of interference are reduced.

10. A method according to claim 9, wherein the signal is filtered after being converted to digital representation.

11. A method according to claim 9, wherein the signal is filtered after being converted to digital representation and wherein the filtering is accomplished by converting the signal from a time domain representation to a frequency domain representation and then decoding this signal by a decoder circuit.

12. A method according to claim 9, wherein the signal is filtered after being converted to digital representation and wherein the filtering is accomplished by converting the signal from a time domain representation to a frequency domain representation and then decoding this signal by decoder means, and where in the decoder means comprises an output bit stream buffer which includes an FFT output bin selection unit which outputs to a feedback circuit, which feedback circuit applies perturbation steps to the digital feedback signal and subsequently vector modulates this signal according to a complex weight; and then converts this digital signal to analogue.

13. A method of reducing the effect of interference in a data demodulator wherein the demodulator receives differential and local field signals at first and second inputs respectively, the method including the steps of:
  sampling the output of the demodulator to reduce the amount of power entering the data demodulator by analogue cancellation of the local field signal;
  inputting the signal to an analogue to digital converter; and
  applying an adaptive perturbation algorithm to reduce interference;
  whereby a weight from a sample of some of the local field signal is derived and is used to reduce the interference that has appeared on the differential mode.

14. A method according to claim 13, wherein the weight is a single complex analogue weight which can appropriately scale and phase shift the local field signal such that, when it is combined with the differential signal, the resultant interference is decreased.

15. A system for transmitting digital data in the form of a differential signal to a subscriber, comprising a twisted wire pair for carrying the differential signal to the subscriber's premises, means for demodulating the differential signal in the presence of RF interference picked up by the twisted pair cable, said demodulator having a digital data system demodulator having first and second inputs arranged to receive differential data signals and local field RFI signals respectively, wherein a feedback signal from the output of the demodulator is sampled, processed and then combined with the local field RFI signal of the demodulator, which combined signal is summed with the differential data input signal to thereby cancel interference coupled with the differential signal.

16. A method of demodulating a differential signal in the presence of a local field RFI signal wherein differential and local field signals are fed to first and second inputs, respectively, of a data demodulator: the method steps comprising:
  inputting the differential signal to a summation means the output of which is converted to digital representation; feeding back a signal which is input to a processing means, generating a weight signal which is multiplied with the local field signal by a multiplication means; and outputting from the multiplication means a signal which is summed with the differential signal by the summation means, whereby the effects of interference are reduced; wherein the signal is filtered after being converted to digital representation wherein the filtering is accomplished by converting the signal from a time domain representation to a frequency domain representation and then decoding this signal by a decoder circuit; and wherein the decoder means comprises an output bit stream buffer which includes an FFT output bin selection unit which outputs to a feedback circuit, which feedback circuit applies perturbation steps to the digital feedback signal and subsequently vector modulates this signal according to a complex weight; and then converts this digital signal to analogue.

17. A method of reducing the effect of interference in a data demodulator wherein the demodulator receives differential and local field signals at first and second inputs respectively, the method including the steps of:

sampling the output of the demodulator to reduce the amount of power entering the data demodulator by analogue cancellation of the local field signal;

inputting the signal to an analogue to digital converter, and;

applying an adaptive perturbation algorithm to reduce interference;

whereby a weight from a sample of some of the local field signal is derived and is used to reduce the interference that has appeared on the differential mode;

wherein the weight is a single complex analogue weight which can appropriately scale and phase shift the local field signal such that, when it is combined with the differential signal, the resultant interference is decreased.

18. A data signal demodulator operable to receive differential and local field signals at first and second inputs respectively;

wherein the first input is connected to a summation means which is operable to output signals to a cascade arrangement of an automatic gain control means, analogue to digital converter, and signal processing means;

wherein the second input is connected to a multiplication means which is operable to receive an input from a feedback circuit; and wherein an output from the multiplication means is connected to the summation means to thereby cancel interference coupled with the differential signal, wherein the signal processing means includes digital filter means comprising a fast Fourier transform processor and a decoder circuit, which decoder circuit comprises an output bit stream buffer which includes an FFT output bin selection unit connected to the feedback circuit; wherein the signal processing means includes digital filter means comprising a fast Fourier transform.

* * * * *